US006846080B2

United States Patent
Inoue et al.

(10) Patent No.: US 6,846,080 B2
(45) Date of Patent: Jan. 25, 2005

(54) IMAGE DISPLAY APPARATUS (75) Inventors: Yoko Inoue, Tokyo (JP); Teruo Fujita, Tokyo (JP); Yoshiyuki Goto, Tokyo (JP); Akira Sekiguchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/635,577

(22) Filed: Aug. 7, 2003

(65) Prior Publication Data
US 2004/0041744 A1 Mar. 4, 2004

(30) Foreign Application Priority Data
Aug. 7, 2002 (JP) .................................. 2002-230148

(51) Int. Cl.$^7$ .............................................. G03B 21/26
(52) U.S. Cl. ............................. 353/37; 353/33; 372/30; 372/15; 372/16; 372/29.015
(58) Field of Search ......................... 315/169.3, 169.1, 315/312, 323, 291; 353/31, 33, 37, 46, 101; 372/9, 15, 16, 30, 29.014, 29.015, 29.02

(56) References Cited

U.S. PATENT DOCUMENTS

| 5,396,304 A | * | 3/1995 | Salerno et al. ............... 353/122 |
| 5,626,409 A | * | 5/1997 | Nakayama et al. ............ 353/31 |
| 5,865,521 A | * | 2/1999 | Hashizume et al. ........... 353/38 |
| 5,971,545 A | | 10/1999 | Haitz .......................... 353/31 |
| 6,517,211 B2 | | 2/2003 | Mihara ....................... 353/98 |

FOREIGN PATENT DOCUMENTS

JP          10-269802 A       10/1998

* cited by examiner

*Primary Examiner*—Haissa Philogene
(74) *Attorney, Agent, or Firm*—Birch, Stewart, Kolasch & Birch, LLP (57) ABSTRACT

An image display apparatus includes a plurality of light emission sources, a drive circuit for pulse-driving the plurality of light emission sources in order in a predetermined period, a moving reflecting mirror for swinging in order in an incidence direction of light from each of the light emission sources in response to the pulse driving timing of each of the light emission sources and reflecting light beams from the light emission sources in order approximately in the same direction, and a combining optical system for guiding the light reflected by the moving reflecting mirror into a light valve.

5 Claims, 8 Drawing Sheets

IMAGE DISPLAY APPARATUS

This nonprovisional application claims priority under 35 U.S.C. §119(a) on Patent Application Nos. 2002-230148 filed in JAPAN on Aug. 7, 2002, which is (are) herein incorporated by reference.

BACKGROUND OF THE INVENTION

1. Field of the Invention

This invention relates to a projection image display apparatus for displaying an image by projecting illumination light modulated by light valve unit of a liquid crystal panel, etc., onto a screen and in particular to an image display apparatus using light emitting diodes, semiconductor lasers, or the like as light emission sources.

2. Description of the Related Art

A projection image display apparatus illuminates light valve unit of a liquid crystal panel, etc., by an illuminating unit and projects illumination light modulated by the light valve unit onto a screen with a projection optical system. In the illuminating unit, white lamps are widely used as light sources. However, in recent years, use of light emitting diodes in place of white lamps has been examined. The light emitting diode has the advantage that it has long life, provides good energy efficiency, and has a low heating value as compared with the white lamp.

Figure 13:
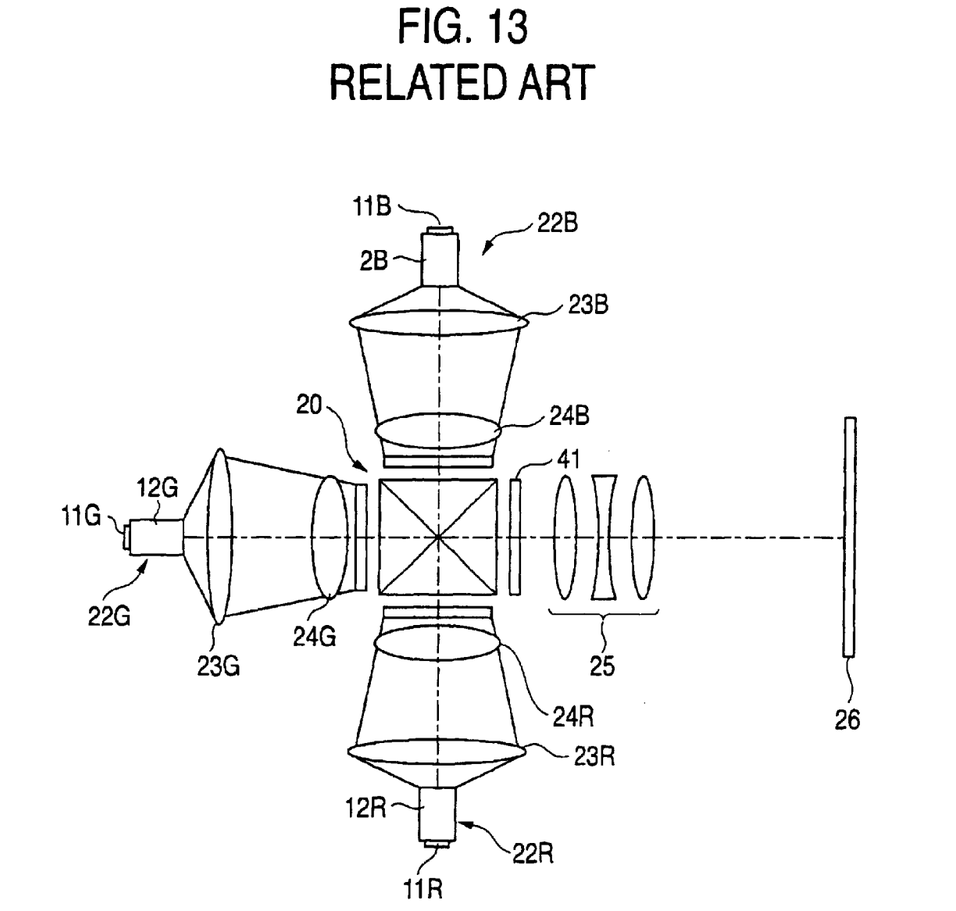
FIG. 13 is a drawing to show the configuration of image display apparatus in related art.

FIG. 13 is a schematic drawing of a single-plate image display apparatus using light emitting diodes as light emission sources. JP-A-10-269802 describes the single-plate image display apparatus in detail. In FIG. 13, numeral 11 denotes a light emitting diode, numeral 12 denotes a kaleidoscope for uniforming the illuminance of light emitted from the light emitting diode, numeral 23 denotes a relay lens, numeral 24 denotes a field lens, numeral 20 denotes a combining prism for combining three color light beams, numeral 22 denotes an illuminating unit comprising the light emitting diode 11 joined to the incidence end face of the kaleidoscope 12, numeral 41 denotes a translucent liquid crystal panel as light valve unit, numeral 25 denotes a projection lens, and numeral 26 denotes a screen. Suffixes R, G, and B on the reference numerals in the figure denote elements corresponding to red, green, and blue respectively.

Red illumination light, green illumination light, and blue illumination light emitted from the light emitting diodes 11R, 11G, and 11B are incident on the kaleidoscopes 12R, 12G, and 12B and are totally reflected repeatedly in the kaleidoscopes 12R, 12G, and 12B to form uniformed red light, green light, and blue light. The uniformed red light, green light, and blue light pass through the relay lenses 23R, 23G, and 23B and the field lenses 24R, 24G, and 24B and are incident on the combining prism 20 for illuminating the light valve 41. At this time, the light emitting diodes 11R, 11G, and 11B are lit repeatedly in the order of red, green, and blue. The red light, green light, and blue light are modulated to image light corresponding to a video signal by the light valve 41 and then the image light is projected onto the screen 26 through the projection lens 25 and is visually recognized as a color image by persistence of vision of a human being.

The image display apparatus using light emitting diodes, semiconductor lasers, or the like as light sources has low intensity as compared with an image display apparatus using white lamps and involves the following problem in providing high intensity:

The intensity of a light emitting diode rises in proportion to a current value, but the life of the light emitting diode is shortened as the applied current is increased. Although the intensity can also be raised by increasing the number of light emitting diodes, light emitted from a light emitting diode distant from the optical axis and is low in transmissibility in an illumination optical system and is poor in light use efficiency. If the total light emission area of the light emitting diodes exceeds a value determined by the radiation solid angle of the light emitting diode and the solid angle of illumination light allowed in an illuminated region, the light flux incident on the illuminated region becomes saturated and the light use efficiency is degraded.

Further, the light emitting diodes differ in temperature characteristic depending on the luminous color; among them, the red light emitting diode easily rises in temperature as compared with other color light emitting diodes and is degraded in output intensity because of the temperature rise and thus much current than that to any other color light emitting diode is applied, resulting in shortening the life of the red light emitting diode; this is also a problem.

SUMMARY OF THE INVENTION

It is therefore an object of the invention to improve light use efficiency and provide high intensity without shortening light source life in a projection image display apparatus using light emitting elements such as light emitting diodes or semiconductor lasers as light sources.

According to a first aspect of the invention, there is provided an image display apparatus including a plurality of light emission sources, a drive circuit and a moving reflecting mirror.

The drive circuit pulse-drives the plurality of light emission sources in order in a predetermined period.

The moving reflecting mirror swings in order in an incidence direction of light from each of the light emission sources in response to the pulse driving timing of each of the light emission sources, and reflects light beams from the light emission sources in order approximately in the same direction.

The light reflected by the moving reflecting mirror is guided into a light valve.

The drive circuit applies a pulse current of amplitude responsive to the ratio of the drive time to the drive period of each of the light emission sources to each of the light emission sources.

The image display apparatus further includes a light emission unit and an optical unit.

The light emission unit emits light by the time the moving reflecting mirror reflects light from each of the light emission sources in order.

The optical unit guides the light from the light emission unit into the light valve.

According to a second aspect of the invention; there is provided an image display apparatus including a plurality of light emission sources, a drive circuit and a rotating prism.

The drive circuit pulse-drives the plurality of light emission sources in order in a predetermined period.

The rotating prism has a reflecting surface inclined at a predetermined angle with an optical axis, and rotates on the optical axis in response to the pulse driving timing of each of the light emission sources, thereby drives the reflecting surface in an incidence direction of light from each of the light emission sources for reflecting the light in the optical axis direction.

The light reflected by the rotating prism is guided into a light valve.

Each of the light emission sources is implemented as a light emitting diode or a semiconductor laser.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Referring now to the accompanying drawings, there are shown preferred embodiments of the invention.

First Embodiment

Figure 1:
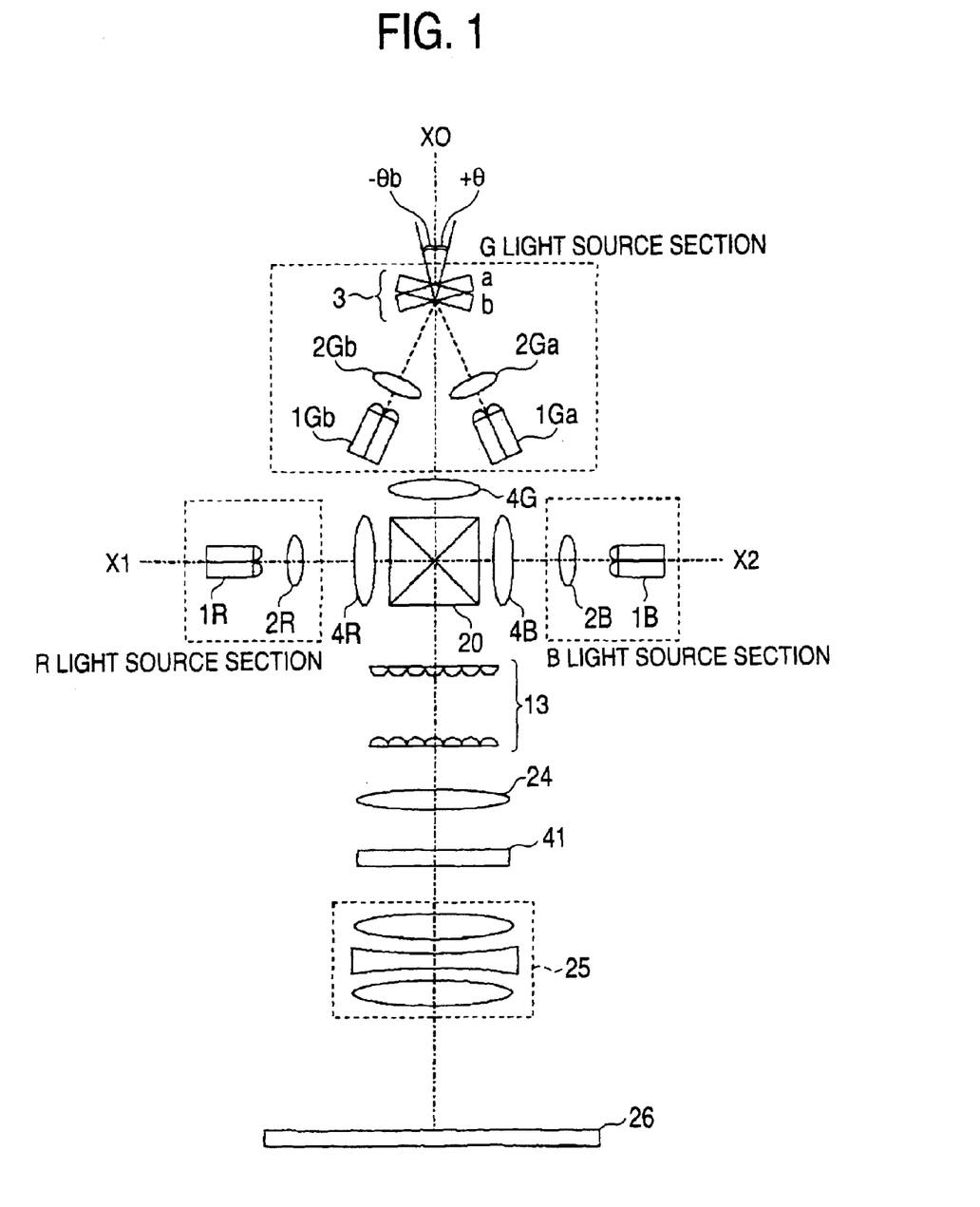
FIG. 1 is a drawing to show the configuration of an image display apparatus according to a first embodiment of the invention.

FIG. 1 is a drawing to show the configuration of an image display apparatus according to a first embodiment of the invention. In FIG. 1, reference numerals 1R, 1Ga, 1Gb, and 1B denote light emission sources implemented as light emitting diodes for representing red (R), green (G), and blue (B). As shown in the figure, in the embodiment, the two light emission sources 1Ga and 1Gb are used for green. Each of the light emission sources 1R, 1Ga, 1Gb, and 1B may be made up of two or more light emitting diodes. Reference numerals 2R, 2Gb, 2Ga, and 2B denote first lenses for gathering light from the light emission sources 1R, 1Gb, 1Ga, and 1B. Numeral 3 denotes a moving reflecting mirror for reflecting light incident through the first lenses 2Ga and 2Gb from the light emission sources 1Ga and 1Gb. Numerals 4R, 4B, and 4G denote second lenses for guiding light from the first lenses 2R and 2B and the moving reflecting mirror 3 into the following stage.

As shown in FIG. 1, the light emission source 1R and the first lens 2R make up an R light source section, the light emission sources 1Ga and 1Gb, the first lenses 2Ga and 2Gb, and the moving reflecting mirror 3 make up a G light source section, and the light emission source 1B and the first lens 2B make up a B light source section. Numeral 20 denotes a color combining prism for reflecting light from the R light source section, the G light source section, and the B light source section in an optical axis X0 direction.

Numeral 13 denotes a fly eye lens system for uniforming R, G, B illumination light combined on the optical axis X0 through the color combining prism 20, and numeral 24 denotes a field lens. Numeral 41 denotes a light valve for modulating the R, G, B illumination light, numeral 25 denotes a projection lens for projecting image light provided by modulating the illumination light by the light valve 41, and numeral 26 denotes a screen on which an image is displayed.

The operation of the light source sections of the image display apparatus according to the embodiment will be discussed with reference to FIG. 1. The light emission sources 1R, 1Ga, 1Gb, and 1B are pulse-driven in order by a control drive circuit (described later). Light emitted from the light emission source 1R and light emitted from the light emission source 1B pass through the first lenses 2R and 2B and the second lenses 4R and 4B and are incident on the color combining prism 20. On the other hand, light emitted from the light emission source 1Ga and light emitted from the light emission source 1Gb are reflected on the moving reflecting mirror 3 and then are incident on the color combining prism 20 through the second lens 4G.

The moving reflecting mirror 3 is driven to positions a and b where the angle between the normal to the reflecting surface and the optical axis X0 becomes +θa and −θb. Here, the incident angles of light from the light emission source 1Ga and light from the light emission source 1Gb on the moving reflecting mirror 3 at the positions a and b become +θa and −θb. The moving reflecting mirror 3 is driven to the position a when the light source 1Ga is lit and is driven to the position b when the light source 1Gb is lit for reflecting light from the light source 1Ga and light from the light source 1Gb alternately in the direction of the optical axis X0 where the color combining prism 20 is disposed.

The three color light beams guided into the color combining prism 20 are reflected in the same optical axis X0 direction and are incident on the fly eye lens system 13 and then uniformly illuminate the light valve 41 through the field lens 24 and are projected onto the screen 26 through the projection lens 25.

Figure 2:
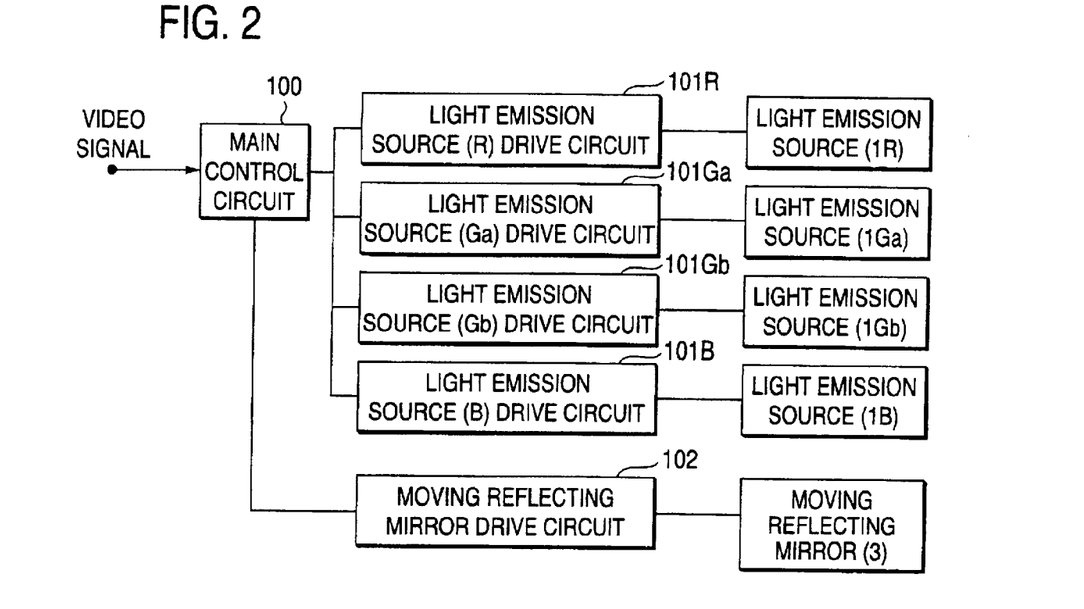
FIG. 2 is a block diagram to show the configuration of a control drive circuit of the image display apparatus according to the first embodiment of the invention.
Figure 3:
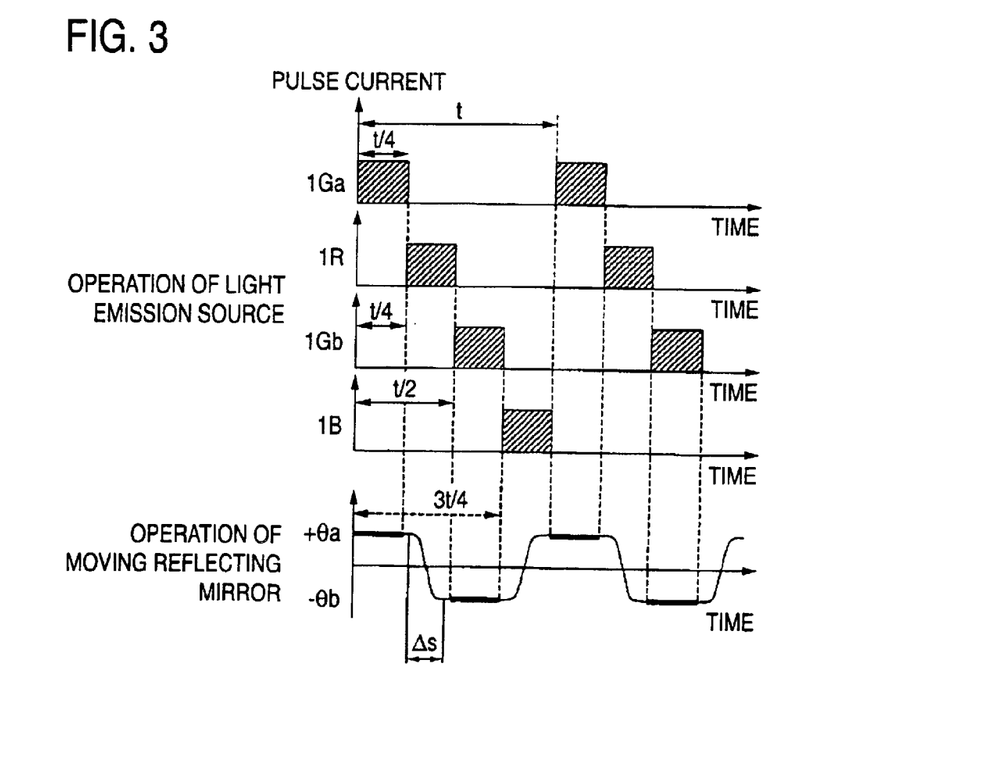
FIG. 3 is a timing chart to show the operation of light emission sources and a moving reflecting mirror of the image display apparatus according to the first embodiment of the invention.

Next, the operation timings of the light emission sources 1R, 1Ga, 1Gb, and 1B and the moving reflecting mirror 3 will be discussed in detail. FIG. 2 is a block diagram to show the configuration of the control drive circuit of the image display apparatus according to the embodiment. FIG. 3 is a chart to show the operation timings of the light emission sources 1R, 1Ga, 1Gb, and 1B and the reflecting mirror 3. As shown in FIG. 2, the control drive circuit is made up of a main control circuit 100, light emission source drive circuits 101R, 101Ga, 101Gb, and 101b for applying pulse current to the light emission sources 1R, 1Ga, 1Gb, and 1B, and a reflecting mirror drive circuit 102 for driving the reflecting mirror 3. The main control circuit 100 generates a control signal for controlling the light emission source drive circuits 101R, 101Ga, 101Gb, and 101b and the reflecting mirror drive circuit 102 based on an input video signal.

The operation of the light emission sources of the image display apparatus according to the embodiment will be discussed with reference to the timing chart of FIG. 3. Letting the light time of each light emission source in one field time period t (for example, 1/60 seconds) be t/4, the light emission sources 1R, 1Ga, 1Gb, and 1B are driven so that the light emission source 1Ga is lit from time 0 to t/4, the light emission source 1R is lit from time t/4 to t/2, the light emission source 1Gb is lit from time t/2 to 3t/4, and the light emission source 1B is lit from time 3t/4 to t in order. On the other hand, the moving reflecting mirror 3 is driven from the position a to b while the light emission source 1R is lit from time t/4 to t/2, and is driven from the position b to a while the light emission source 1B is lit from time 3t/4 to t.

Here, the rise time from applying a drive current to the light emitting diode to reaching stationary output of 100% is about several 0.1 $\mu$s; while the moving reflecting mirror 3 requires transition time $\Delta$s of several 100 $\mu$s between the instant when a drive signal is applied to the moving reflecting mirror 3 and the instant when the moving reflecting mirror 3 moves to a predetermined position. Thus, to drive the light emission source 1Gb consecutively following the light emission source 1Ga, light from the light emission source 1Gb is not guided into the color combining prism 20 during the transition time $\Delta$s. That is, a delay of about 100 $\mu$s occurs by the time the moving reflecting mirror 3 guides light of the light emission source 1Ga into the color combining prism 20, and meanwhile the light is lost. Then, in the embodiment, the transition time $\Delta$s of the moving reflecting mirror 3 is considered to set the driving order of the light emission sources. This means that the lighting order of the light emission sources is set to 1Ga, 1R, 1Gb, 1B, thereby preventing light loss accompanying move of the moving reflecting mirror 3. The lighting order of 1Ga and 1Gb and the lighting order of 1R and 1B may be changed like 1Ga, 1B, 1Gb, 1R.

As described early, the intensity of the light emission source can be increased as the applied current amount is increased. However, if the current amount is increased, the life of the light emitting diode is shortened. Then, this problem is solved as the image display apparatus according to the embodiment uses the moving reflecting mirror 3 to reflect light from the light emission source 1Ga and light from the light emission source 1Gb alternately in the optical axis X0 direction, thereby increasing the number of light emission sources pulse-driven in order in one field time period t and decreasing the duty ratio of pulse currents applied to the light emission sources 1R, 1Ga, 1Gb, and 1B.

Figure 4:
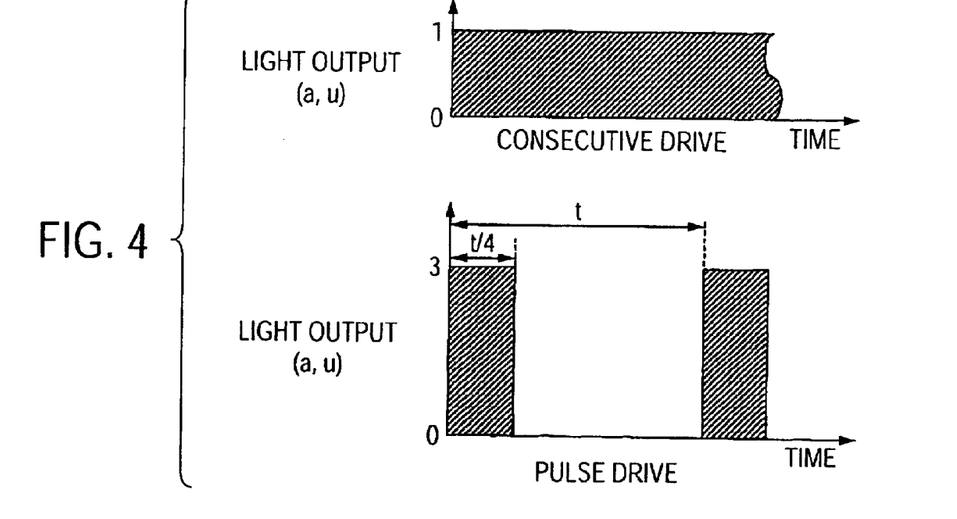
FIG. 4 is a drawing to show light output of light emitting diode in consecutive driving and that in pulse driving.

As shown in FIG. 4, letting the rated direct current of a light emitting diode (the rated current for consecutively driving the light emitting diode) be Io, assuming that the drive time of the light emitting diode in one field time period t is t/4, the light emitting diode can be driven at pulse current 4Io which is four times the rated direct current Io (here, it is assumed that the rated direct current Io of one color light emitting diode equals that of another). Accordingly, output of each light emission source 1R, 1Ga, 1Gb, 1B becomes four times output in the rated direct current Io. Thus, when the pulse current is increased, the duty is decreased, whereby high intensity can be provided without shortening the life of the light emitting diode. Since light beams from a plurality of pulse-driven light emission sources are superposed on each other on the same optical axis in order by the moving reflecting mirror 3, the light beams from a plurality of light emission sources can be guided efficiently into the light valve for enhancing the light use efficiency.

Figure 5:
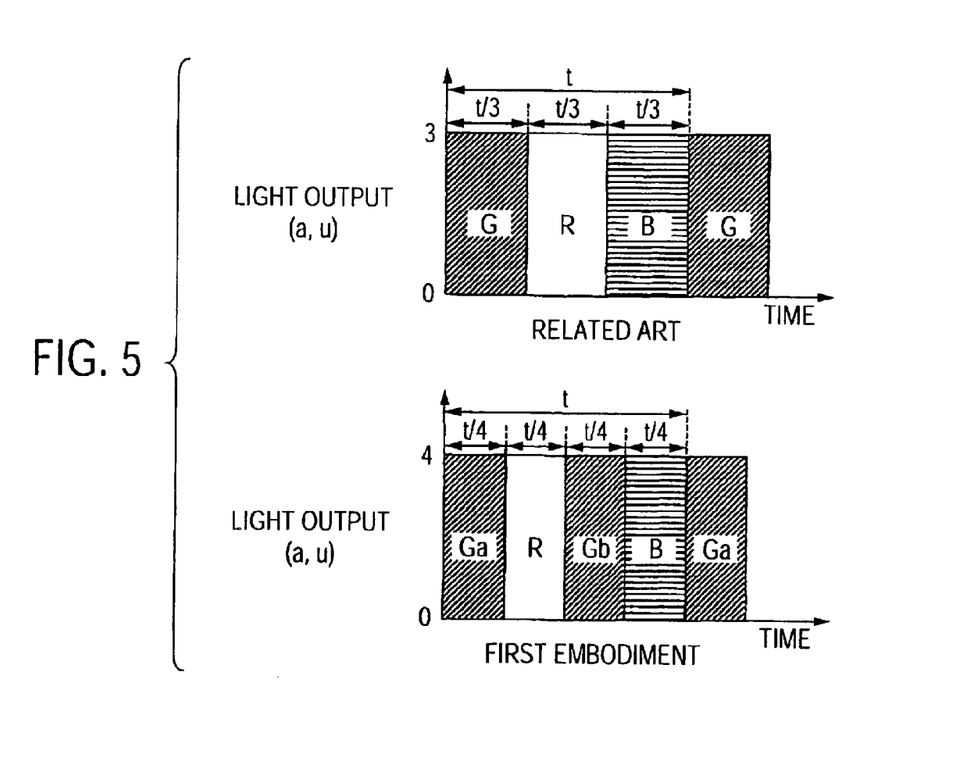
FIG. 5 is a drawing to show light output of the image display apparatus according to the first embodiment of the invention and light output of image display apparatus in related art.

FIG. 5 is a drawing to show light output of the image display apparatus according to the embodiment for driving the four light emission sources 1R, 1Ga, 1Gb, and 1B in one field time period t and light output of image display apparatus in related art for driving three light emission sources R, G, and B. In FIG. 5, the horizontal axis represents the time and the vertical axis represents light output. Here, the light output is represented as a relative value with light output when the rated direct current Io is allowed to flow as 1. In the image display apparatus in the related art, the pulse drive time of the light emission source in one field time period t is t/3 (namely, duty 33.3%) and the light output becomes 3. In contrast, in the image display apparatus according to the embodiment, the pulse drive time of the light emission source becomes t/4 (namely, duty 25%) and thus the light output becomes 4, providing output 4/3 times output in the related art.

In the embodiment, the two light emission sources 1Ga and 1Gb are used for green, so that output of green light requiring a larger light amount for color reproduction can be raised.

In the embodiment, the two light emission sources 1Ga and 1Gb are used for green to increase the number of the light emission sources driven in one field time period t, but a plurality of light emission sources may be provided for any other color and may be guided onto the same optical axis by the moving reflecting mirror. That is, two light emission sources may be provided for each of red and blue, light from the light emission sources may be reflected in optical axis X1, X2 direction by a moving reflecting mirror, and the six light emission sources may be driven in one field time period t. In this case, the duty of pulse current becomes t/6, so that the value of pulse current is set to six times the rated direct current Io, whereby output intensity twice that in the related art shown in FIG. 5 can be provided.

In the embodiment, the duty of pulse current applied to each of the light emission sources 1R, 1Ga, 1Gb, and 1B is 25% and the pulse current value is set to four times the rated direct current Io, but the duty and the pulse current value may be set as desired in response to the characteristics of the light emitting diodes.

In the embodiment, the pulse drive period of each light emission source is set to one field time period t, but may be set to one frame time period (1/30 seconds).

In the embodiment, the light emission sources are implemented as the light emitting diodes, but a semiconductor laser, etc., having a-comparatively short rise time (several 100 ns) from applying a drive current to the semiconductor laser, etc., to reaching stationary output of 100% may be used.

The moving reflecting mirror 3 can also be implemented as a prism, etc., and various lenses may be placed between the light emission source 1G and the moving reflecting mirror 3 or between the moving reflecting mirror 3 and the color combining prism 20.

The light valve is not limited to a liquid crystal panel and the embodiment can also be applied to a reflection type light valve such as a DMD (digital micromirror device).

Second Embodiment

Figure 6:
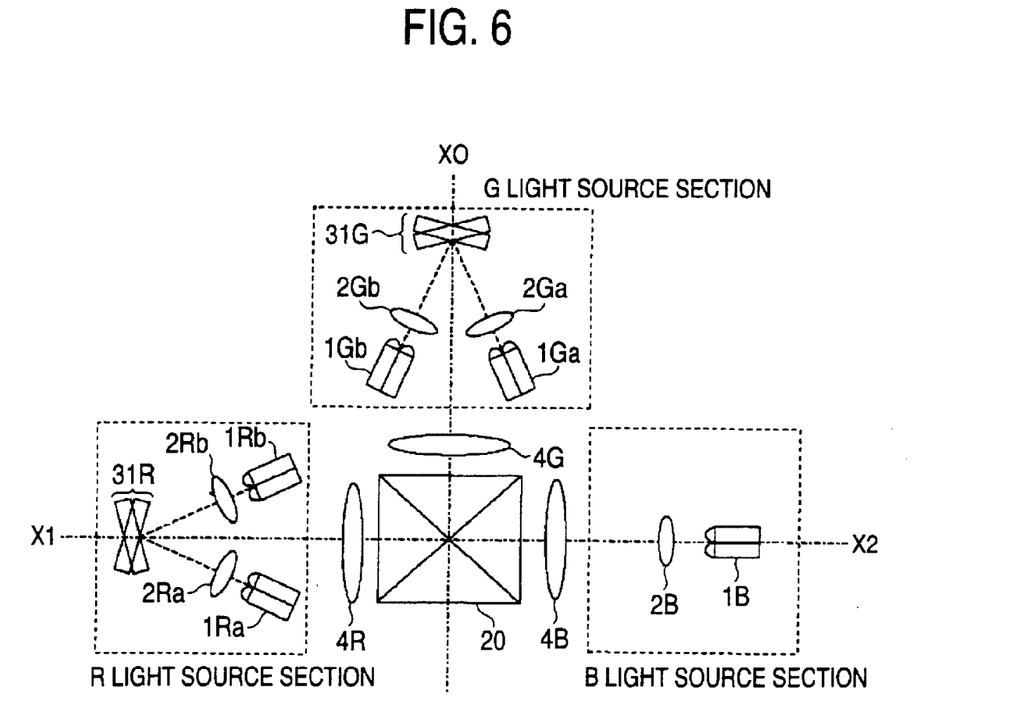
FIG. 6 is a drawing to show the configurations of light source sections of an image display apparatus according to a second embodiment of the invention.

FIG. 6 is a drawing to show the configurations of R, G, and B light source sections of an image display apparatus according to a second embodiment of the invention. In the embodiment, the R light source section is made up of two red light emission sources 1Ra and 1Rb and a moving reflecting mirror 31R for reflecting light fluxes from the light emission sources in an optical axis X1 direction where a color combining prism 20 is disposed. Reference numerals 2Ra and 2Rb denote first lenses for gathering light from the light emission source 1Ra and light from the light emission source 1Rb.

Figure 7:
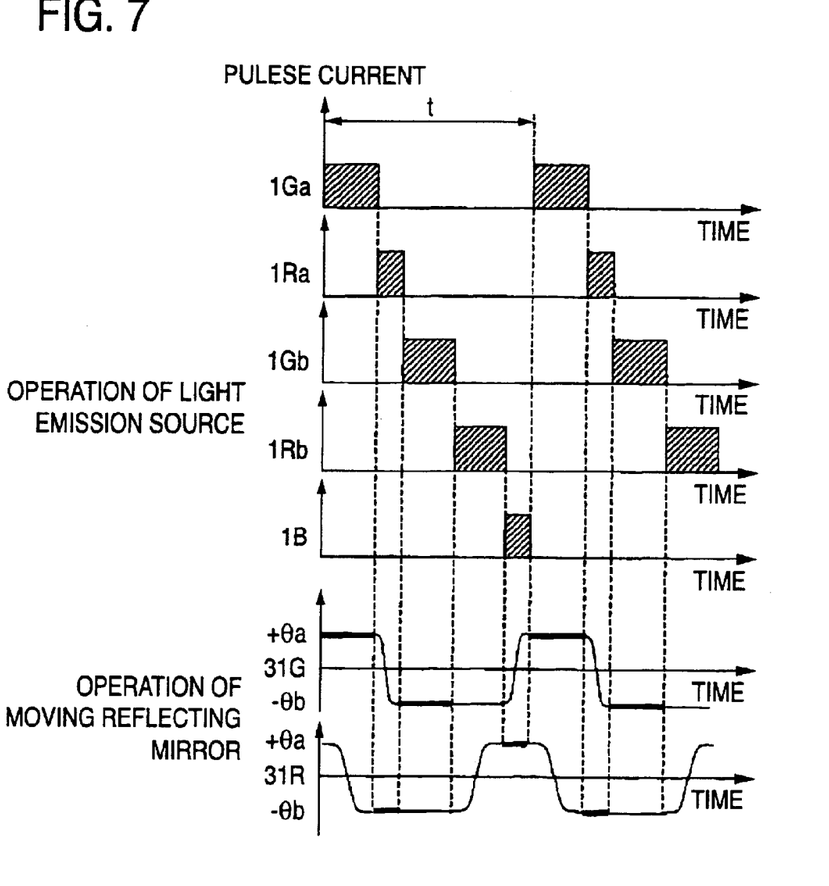
FIG. 7 is a timing chart to show the operation of light emission sources and moving reflecting mirrors of the image display apparatus according to the second embodiment of the invention.

Next, the operation of the light source sections of the image display apparatus according to the second embodiment will be discussed. FIG. 7 is a chart to show the drive timings of light emission sources 1Ga, 1Gb, 1Ra, 1Rb, and 1B and moving reflecting mirrors 31R and 31G shown in FIG. 6. In FIG. 7, the horizontal axis represents the time and the vertical axis represents the amplitude of pulse current applied to each light emission source. In the embodiment, the duty ratio of drive currents is set in response to the characteristics of light emitting diodes forming the light emission sources. The light emission order is set to 1Ga, 1Ra, 1Gb, 1Rb, 1B so that the same color is not continuous as in the first embodiment. That is, the moving reflecting mirror 31G is driven while the red and blue light emission sources 1Ra, 1Rb, and 1B are lit, and the moving reflecting mirror 31R is driven while the green and blue light emission sources 1Ga, 1Gb, and 1B are lit.

The light emitting diodes have different temperature characteristics depending on the luminous color as described early. Particularly, the red light emitting diode using an AlInGaP-based material is an element largely affected by temperature rise as compared with other color light emitting diodes. For example, assuming that emission light of the red light emitting diode at room temperature is 100, emission light at a temperature of 50° C., that at a temperature of 60° C., and that at a temperature of 80° C. become 80, 70, and 60 respectively; the output decreases with temperature rise. Therefore, in the embodiment, light from the red light emission source 1Ra and light from the red light emission source 1Rb are reflected by the moving reflecting mirror 31R alternately in the optical axis X1 direction as shown in FIG. 6, whereby the drive time (duty) of each of the red light emission sources 1Ra and 1Rb in one frame time period is decreased, so that temperature rise of the elements is prevented and predetermined intensity can be provided without increasing the drive current.

As described above, a plurality of light emission sources are provided in response to the temperature characteristics of the light emitting diodes and light beams from the light emission sources are reflected by the moving reflecting mirror in the same optical axis direction in order, whereby the drive time of each light emission source can be shortened and thus the life of each light emitting diode can be prolonged.

Third Embodiment

Figure 8:
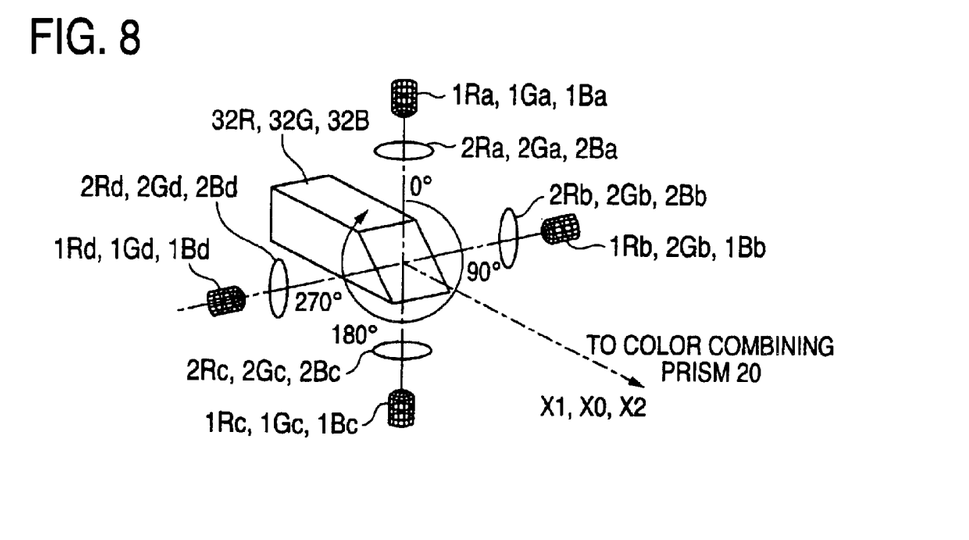
FIG. 8 is a drawing to show the configurations of light source sections of an image display apparatus according to a third embodiment of the invention.

FIG. 8 is a drawing to show different configurations of R, G, and B light source sections of the image display apparatus shown in FIG. 1. In FIG. 8, reference numerals 32R, 32G, and 32B denote rotating prisms being disposed on optical axes X1, X0, and X2 toward a color combining prism 20 (see FIG. 1) for rotation on each of the optical axes. The rotating prism 32G is surrounded by four light emission sources 1Ga, 1Gb, 1Gc, and 1Gd placed circumferentially with a 90-degree spacing centering on the optical axis X0. Likewise, the rotating prism 32R and 32B is surrounded by four light emission sources 1Ra, 1Rb, 1Rc, and 1Rd (1Ba, 1Rb, 1Rc, and 1Rd) placed circumferentially with a 90-degree spacing centering on the optical axis X1 (X2).

Figure 9:
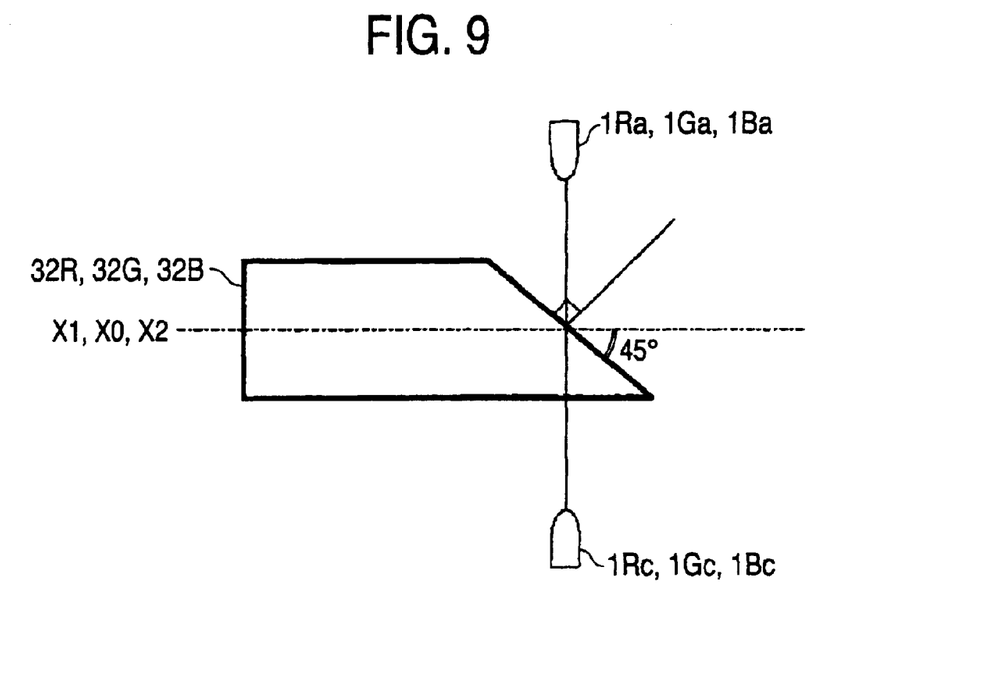
FIG. 9 is a drawing to show the structure of each rotating prism.

As shown in FIG. 9, the reflecting surface of the rotating prism 32G, 32R, 32B has a 45-degree slope relative to the optical axis X0, X1, X2, and light from each light emission source is incident on the reflecting surface of the rotating prism at an incidence angle of 45 degrees. The light emission sources are placed circumferentially with a spacing of 360/n degrees (n is the number of the light emission sources).

Figure 10:
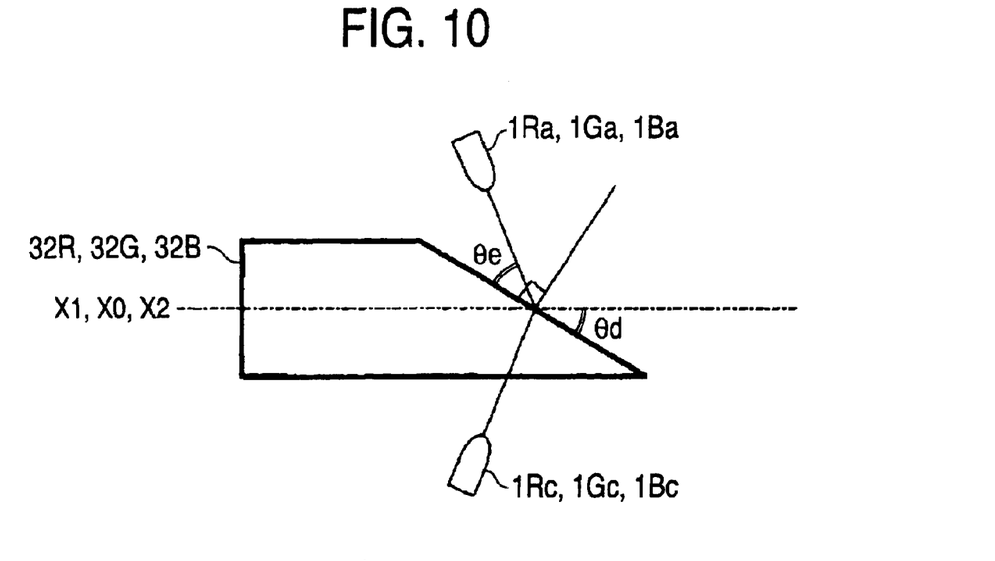
FIG. 10 is a drawing to show the structure of each rotating prism.

In the rotating prism 32R, 32G, 32B shown in FIG. 9, the angle of the reflecting surface with the optical axis X1, X0, X2 is 45 degrees. However, as shown in FIG. 10, angle $\theta e$ of the reflecting surface with the optical axis X1, X0, X2 may be set to any angle if it is the same as light incidence angle $\theta d$ from each light emission source (however, $0° < \theta d < 90°$).

Figure 11:
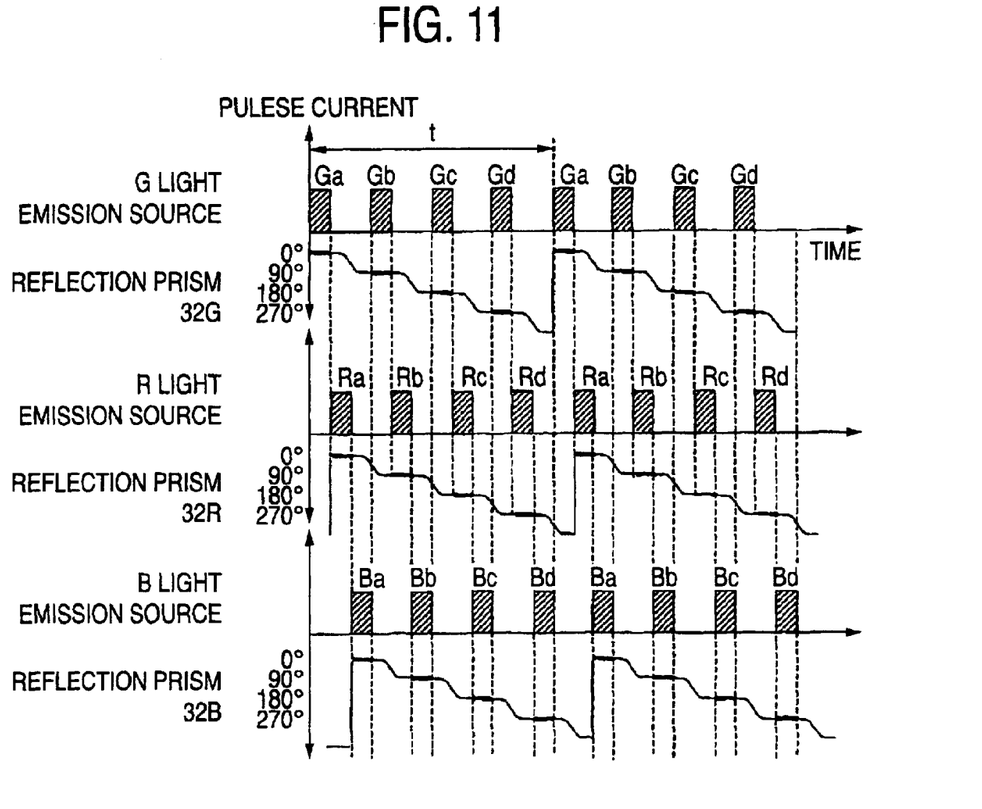
FIG. 11 is a timing chart to show the operation of light emission sources and moving reflecting mirrors of the image display apparatus according to the third embodiment of the invention.

FIG. 11 is a chart to show an example of the operation timings of the light emission sources of the R, G, and B light source sections shown in FIG. 8. As shown in FIG. 11, the light emission sources are driven in the order of green, red, and blue. At this time, at the termination of light emission of the light emission source 1Ga, the rotating prism 32G of the G light source section rotates 90 degrees in the light emission time period of the red and blue light emission sources 1Ra and 1Ba and reflects light from the light emission source 1Gb in the direction of the optical axis X0. Likewise, at the termination of light emission of the light emission source 1Ra, the rotating prism 32R of the R light source section rotates 90 degrees in the light emission time period of the blue and green light emission sources 1Ba and 1Gb and reflects light from the light emission source 1Rb in the direction of the optical axis X1. At the termination of light emission of the light emission source 1Ba, the rotating prism 32B of the B light source section rotates 90 degrees in the light emission time period of the green and red light emission sources 1Gb and 1Rb and reflects light from the light emission source 1Bb in the direction of the optical axis X2.

Figure 12:
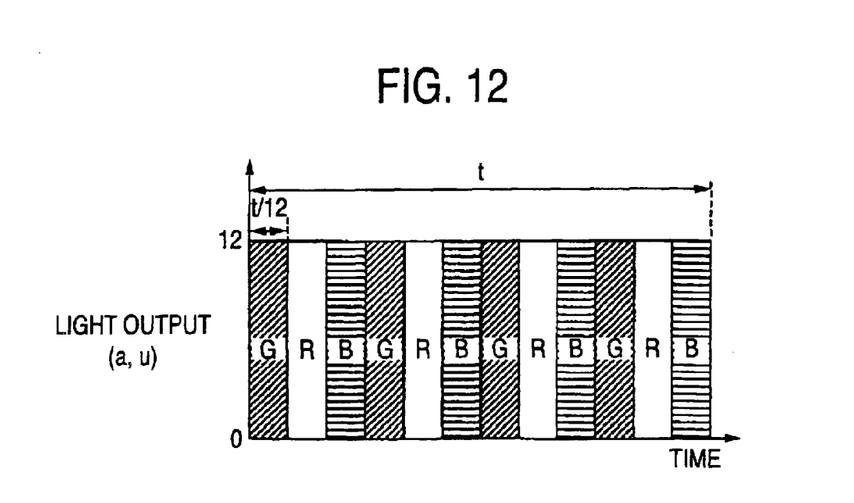
FIG. 12 is a drawing to show light output of the image display apparatus according to the third embodiment of the invention.

FIG. 12 is a drawing to show light output of the image display apparatus according to the embodiment. In the embodiment, in the R, G, and B light source sections, light beams from the four light emission sources are reflected by the rotating prisms 32R, 32G, and 32B in order toward the color combining prism 20 and therefore the light emission time of each light emission source in one field time period t becomes t/12. Accordingly, the pulse current value applied to each light emission source can be set to 12 times rated direct current Io, so that light output four times light output of the image display apparatus in the related art for driving the three light emission sources of R, G, and B in one frame time period t (see FIG. 5) can be provided.

As described above, the rotating prisms are used to reflect light beams from a large number of light emission sources in the same optical axis direction, whereby the emission light beams from a large number of light emission sources can be superposed on each other on the same optical axis in a time division manner according to the simple configuration. As the number of the light emission sources driven in one frame time period t is increased and the duty of the pulse current applied to each light emission source is decreased, the value of the pulse current is increased accordingly, whereby high intensity can be provided without shortening the life of each light emission source.

In the configuration of the light source sections shown in FIG. 8, the light emission sources are equally spaced from each other, but the spacing of the light emission sources may be changed whenever necessary if it corresponds to the rotation angle of each rotating prism.

The image display apparatus as claimed in claim 1 pulse-drives a plurality of light emission sources in order in a predetermined period and drives a moving reflecting mirror in response to the pulse driving timing of each of the light emission sources, thereby reflecting light beams from the light emission sources in order approximately in the same direction, so that the light beams from the light emission sources can be efficiently guided into a light valve.

The image display apparatus as claimed in claim 2 applies a pulse current of amplitude responsive to the ratio of the drive time to the drive period of each of the light emission sources to each of the light emission sources, so that high intensity can be provided without shortening the life of each light emission source.

The image display apparatus as claimed in claim 3 further includes a light emission unit for emitting light by the time the moving reflecting mirror reflects light from each of the light emission sources in order, so that degradation of the intensity in the drive time period of the moving reflecting mirror is prevented and the intensity can be enhanced.

The image display apparatus as claimed in claim 4 pulse-drives a plurality of light emission sources in order in a predetermined period and drives a rotating prism in response to the pulse driving timing of each of the light emission sources, thereby reflecting light beams from the light emission sources in order approximately in the same direction, so that the emission light beams from a larger number of light emission sources can be guided efficiently into a light valve according to the simple configuration.

The image display apparatus as claimed in claim 5 has each light emission source implemented as a light emitting diode or a semiconductor laser, so that the life of each light source can be prolonged.

What is claimed is:

1. An image display apparatus comprising:
   a plurality of light emission sources;
   a drive circuit for pulse-driving the plurality of light emission sources in order in a predetermined period; and
   a moving reflecting mirror for swinging in order in an incidence direction of light from each of the light emission sources in response to the pulse driving timing of each of the light emission sources and reflecting light beams from the light emission sources in order approximately in the same direction,
   wherein the light reflected by the moving reflecting mirror is guided into a light valve.

2. The image display apparatus according to claim 1, wherein the drive circuit applies a pulse current of amplitude responsive to the ratio of the drive time to the drive period of each of the light emission sources to each of the light emission sources.

3. The image display apparatus according to claim 1 further comprising:
   a light emission unit for emitting light by the time that the moving reflecting mirror reflects light from each of the light emission sources in order; and
   an optical unit for guiding the light from the light emission unit into the light valve.

4. The image display apparatus according to claim 1, wherein each of the light emission sources is a light emitting diode or a semiconductor laser.

5. An image display apparatus comprising:
   a plurality of light emission sources;
   a drive circuit for pulse-driving the plurality of light emission sources in order in a predetermined period; and
   a rotating prism having a reflecting surface inclined at a predetermined angle with an optical axis, the rotating prism for rotating on the optical axis in response to the pulse driving timing of each of the light emission sources, thereby driving the reflecting surface in an incidence direction of light from each of the light emission sources for reflecting the light in the optical axis direction,
   wherein the light reflected by the rotating prism is guided into a light valve.

* * * * *